(12) United States Patent
Hilsenbeck

(10) Patent No.: US 9,598,610 B2
(45) Date of Patent: Mar. 21, 2017

(54) ASPHALT UPGRADING WITHOUT OXIDATION

(71) Applicant: TAMKO Building Products, Inc., Joplin, MO (US)

(72) Inventor: Shane Hilsenbeck, Joplin, MO (US)

(73) Assignee: TAMKO Building Products, Inc., Joplin, MO (US)

( * ) Notice: Subject to any disclaimer, the term of this patent is extended or adjusted under 35 U.S.C. 154(b) by 0 days.

(21) Appl. No.: 14/705,302

(22) Filed: May 6, 2015

(65) Prior Publication Data

US 2015/0322263 A1  Nov. 12, 2015

Related U.S. Application Data

(60) Provisional application No. 61/991,794, filed on May 12, 2014.

(51) Int. Cl.
| | |
|---|---|
| *C09D 195/00* | (2006.01) |
| *C08L 95/00* | (2006.01) |
| *C08L 91/06* | (2006.01) |
| *C08L 23/02* | (2006.01) |

(52) U.S. Cl.
CPC ............ *C09D 195/00* (2013.01); *C08L 23/02* (2013.01); *C08L 91/06* (2013.01); *C08L 95/00* (2013.01)

(58) Field of Classification Search
CPC ....................................................... C08L 23/02
USPC ........................................................ 524/62
See application file for complete search history.

(56) References Cited

U.S. PATENT DOCUMENTS

| | | |
|---|---|---|
| 812,539 A | 2/1906 | Wilkin |
| 1,782,186 A | 11/1930 | Abson |
| 2,179,208 A | 11/1939 | Burk et al. |
| 2,200,914 A | 5/1940 | Burk et al. |
| 2,233,259 A | 2/1941 | Harth |
| 2,375,117 A | 5/1945 | Lentz |
| 2,450,756 A | 10/1948 | Hoiberg |
| 2,762,755 A | 9/1956 | Kinnaird, Jr. |
| 3,126,329 A | 3/1964 | Fort |
| 3,281,383 A | 10/1966 | Zelinski et al. |
| 4,325,641 A | 4/1982 | Babus et al. |
| 4,338,137 A | 7/1982 | Goodrich |
| 4,584,023 A | 4/1986 | Goodrich |
| 4,706,893 A | 11/1987 | Brock |
| 4,837,252 A | 6/1989 | Seguin et al. |
| 5,002,987 A | 3/1991 | Schulz |
| 5,090,861 A | 2/1992 | Malcolm et al. |
| 5,102,487 A | 4/1992 | Lamb |
| 5,201,472 A | 4/1993 | Brock |
| 5,470,146 A | 11/1995 | Hawkins |
| 5,626,659 A | 5/1997 | Chivers |
| 5,973,037 A | 10/1999 | Fields |
| 6,039,914 A | 3/2000 | Gehrke et al. |
| 6,194,519 B1 | 2/2001 | Blalock et al. |
| 6,384,112 B1 | 5/2002 | Boussad |
| 6,497,930 B1 | 12/2002 | Petermeier |
| 6,521,076 B1 | 2/2003 | Elliott |
| 6,544,374 B2 | 4/2003 | King et al. |
| 6,743,313 B2 | 6/2004 | Mischo |
| 7,052,635 B2 | 5/2006 | Mischo |
| 7,297,301 B1 | 11/2007 | Deschamps et al. |
| 7,805,909 B2 | 10/2010 | Teng et al. |
| 7,857,904 B2 | 12/2010 | Trumbore et al. |
| 7,901,563 B2 | 3/2011 | Ruan et al. |
| 7,913,940 B2 | 3/2011 | Harmon |
| 7,951,239 B2 | 5/2011 | Trumbore et al. |
| 7,951,240 B2 | 5/2011 | Trumbore |
| 8,394,730 B2 | 3/2013 | Grube et al. |
| 8,753,442 B2 | 6/2014 | Trumbore et al. |
| 2002/0066233 A1 | 6/2002 | McArdle |
| 2002/0066813 A1 | 6/2002 | Mischo |
| 2005/0051055 A1 | 3/2005 | Rivas et al. |
| 2008/0041982 A1 | 2/2008 | Paulson et al. |
| 2010/0104809 A1 | 4/2010 | Duda |
| 2010/0203336 A1 | 8/2010 | Shiao et al. |
| 2011/0086201 A1 | 4/2011 | Shiao et al. |
| 2011/0196073 A1* | 8/2011 | Fee .......................... C08L 95/00 524/68 |
| 2011/0197785 A1 | 8/2011 | Trumbore |
| 2012/0248231 A1 | 10/2012 | Fredsall |
| 2013/0042793 A1 | 2/2013 | Peregrine et al. |
| 2014/0044871 A1 | 2/2014 | Svec |
| 2014/0069297 A1 | 3/2014 | Rutz et al. |
| 2014/0263779 A1 | 9/2014 | Svec et al. |
| 2014/0299017 A1* | 10/2014 | Parvez .................... C08L 95/00 106/270 |
| 2015/0044365 A1 | 2/2015 | Svec |

FOREIGN PATENT DOCUMENTS

| | | |
|---|---|---|
| GB | 1449121 | 9/1976 |
| JP | 55056168 | 4/1980 |
| WO | 2012033490 | 3/2012 |

* cited by examiner

*Primary Examiner* — Doris Lee
(74) *Attorney, Agent, or Firm* — William W. Cochran; Cochran Freund & Young LLC

(57) ABSTRACT

Disclosed are asphalts that are suitable for making shingles and other roofing material, i.e., coating asphalts, from harder paving asphalts, without oxidation of the paving asphalts. This is achieved by using various additives, including polyethylene waxes, low density and high density polyethylene materials, hard paraffin polyethylene, Sasol waxes, that are made using the Fischer-Tropsch process, and thermoplastic polyolefins that reduce brittleness at cold temperatures.

13 Claims, 4 Drawing Sheets

| Wax | Wax Type | Wax % | SP | Pen |
|---|---|---|---|---|
| Sasobit | Fischer Tropsch | 5% | 202 F | 21 dmm |
| | | 7.5% | 211 F | 19 dmm |
| | | 10% | 215 F | 15 dmm |
| Vestowax A612 | Polyethylene (HDPE) | 5% | 193 F | 19 dmm |
| | | 6% | 222 F | 20 dmm |

Fig. 2A

| 69% Filled Coating | Oxidized | 6% Vestowax | 6% Vestowax & 3% Adflex |
|---|---|---|---|
| Unfilled Soft Point (°F) | 207 | 222 | 217 |
| Unfilled Pen (dmm) | 20 | 20 | 18 |
| Flash Point (°F) | 620 | 555 | 555 |
| Filled Soft Point (°F) | 250 | 229 | 235 |
| 400°F Viscosity (cps) | 9748 | 527 | 1437 |
| Initial Flexibility (°F) | 35 | 45 | 40 |
| PAV Flexibility (°F) | 55 | >75 (Fail) | 65 |
| Stain Index | 5 | 0 | 0 |
| 2000hr WOM | Pass | Pass | Pass |

Fig. 2B

| Paving Asphalt | Wax | Ini-talSP | Initial Pen | Modified SP | Modified Pen |
|---|---|---|---|---|---|
| Source A PG 64-22 | 10% Sasobit | 123 F | 67 dmm | 213 F | 21 dmm |
| Source B PG 67-22 | 7.5% Sasobit | 121 F | 63 dmm | 208 F | 25 dmm |
| | 10% Sasobit | | | 213 F | 19 dmm |
| Source B PG 67-22 | 10% Vestowax | 121 F | 63 dmm | 232 F | 26 dmm |
| | 15% Vestowax | 121 F | 63 dmm | 240 F | 20 dmm |
| Source B PG 67-22 | 10% Ceranovus GW115 (HDPE) | 121 F | 63 dmm | 227 F | 27 dmm |
| | 15% GW115 | 121 F | 63 dmm | 234 F | 19 dmm |

Fig. 3

| Wax | Wax Type | Wax % | 0-Pen% | SP | Pen |
|---|---|---|---|---|---|
| Sasobit | Fischer Tropsch | 3% | 5% | 192 F | 18 dmm |
| | | | 10% | 193 F | 16 dmm |
| | | | 15% | 192 F | 15 dmm |

Fig. 4

| Wax | Wax Type | Wax % | 0-Pen% | SP | Pen |
|---|---|---|---|---|---|
| Sasobit | Fischer Tropsch | 10% | 0% | 220 F | 24 dmm |
| | | | 10% | 218 F | 23 dmm |
| | | | 20% | 217 F | 17 dmm |
| Vestowax A612 | HDPE | 10% | 0% | 237 F | 24 dmm |
| | | | 10% | 233 F | 22 dmm |
| | | | 20% | 233 F | 18 dmm |
| Ceranovus AW115-A | Recycled HDPE | 10% | 0% | 227 F | 26 dmm |
| | | | 10% | 226 F | 22 dmm |
| | | | 20% | 223 F | 20 dmm |
| | | | 30% | 196 F | 17 dmm |
| Ceranovus AW93-ID | Recycled LDPE | 10% | 20% | 196 F | 24 dmm |
| | | 12% | | 222 F | 21 dmm |
| | | 15% | | 221 F | 16 dmm |
| Ceranovus AW95-ED | Recycled HDPE | 10% | 20% | 196 F | 22 dmm |
| | | 12% | | 222 F | 20 dmm |
| | | 15% | | 223 F | 16 dmm |

Fig. 5

| Blend | Naphtha Resid | SP | Pen | PAV Flex |
|---|---|---|---|---|
| AC-20/0-Pen/AW-115A | 0% | 203 F | 16 dmm | Fail |
| | 10% | 201 F | 16 dmm | Pass |

Fig. 6

ASPHALT UPGRADING WITHOUT OXIDATION

CROSS-REFERENCE TO RELATED APPLICATION

This application is based upon and claims priority to U.S. provisional application Ser. No. 61/991,794, filed May 12, 2014, entitled "Asphalt Upgrading Without Oxidation," which application is specifically incorporated herein by reference for all that it discloses and teaches.

BACKGROUND

Asphalt has been used extensively for building products, including roofing shingles. Roofing shingles are constructed using coating asphalts that coat a substrate, such as a felt layer, to form a shingle. Asphalt shingles provide a durable and economical roofing material. Asphalt shingles are widely used as a roofing material and provide a long lasting surface for a roof.

SUMMARY

An embodiment of the present invention may therefore comprise a method of modifying a non-coating grade asphalt to produce a coating grade asphalt without oxidation of the non-coating grade asphalt comprising: heating the non-coating grade asphalt to a melting temperature in a mixing chamber to produce a melted non-coating grade asphalt, the non-coating grade asphalt comprising: a blend of 35/50 Pen-graded asphalt and 5% to 15% of 0-Pen asphalt; mixing the melted non-coating grade asphalt with an additive to create a mixture that improves properties of the non-coating grade asphalt to properties of a coating grade asphalt, without oxidizing the non-coating grade asphalt, the additive comprising: a fine crystalline, long chain, aliphatic polymethylene hydrocarbon wax having a concentration of approximately 3% of the mixture.

An embodiment of the present invention may further comprise a method of modifying a non-coating grade asphalt to produce a coating grade asphalt without oxidation of the non-coating grade asphalt comprising: heating the non-coating grade asphalt to a melting temperature in a mixing chamber to produce a melted non-coating grade asphalt, the non-coating grade asphalt comprising: a blend of AC-20 asphalt and 0% to 20% of 0-Pen asphalt; mixing the melted non-coating grade asphalt with additive to create a mixture which improves properties of the non-coating grade asphalt to properties of a coating grade asphalt, without oxidizing the non-coating grade asphalt, the additives comprising: a fine crystalline, long chain, aliphatic polymethylene hydrocarbon wax having a concentration of approximately 0% to 20% of the mixture; a thermoplastic polyolefin having a concentration of approximately 3% of the mixture to increase flexibility at low temperatures.

An embodiment of the present invention may further comprise a method of modifying a non-coating grade asphalt to produce a coating grade asphalt without oxidation of the non-coating grade asphalt comprising: heating the non-coating grade asphalt to a melting temperature in a mixing chamber to produce a melted non-coating grade asphalt, the non-coating grade asphalt comprising: a blend of AC-20 asphalt and 0% to 20% of 0-Pen asphalt; mixing the melted non-coating grade asphalt with additives to create a mixture which improves properties of the non-coating grade asphalt to properties of a coating grade asphalt, without oxidizing the non-coating grade asphalt, the additives comprising: a polyethylene synthetic wax having a concentration of 0% to 20% of the mixture; a thermoplastic polyolefin having a concentration of approximately 3% of the mixture.

An embodiment of the present invention may further comprise a method of modifying a non-coating grade asphalt to produce a coating grade asphalt without oxidation of the non-coating grade asphalt comprising: heating the non-coating grade asphalt to a melting temperature in a mixing chamber to produce a melted non-coating grade asphalt, the non-coating grade asphalt comprising: a blend of AC-20 asphalt and 0% to 30% 0-Pen asphalt; mixing the melted non-coating grade asphalt with additives to create a mixture which improves properties of the non-coating grade asphalt to properties of a coating grade asphalt, without oxidizing the non-coating grade asphalt, the additives comprising: a synthetic wax produced by de-polymerization of polyethylene or polypropylene having a concentration of approximately 10% of the mixture; a thermoplastic polyolefin having a concentration of approximately 3% of the mixture.

An embodiment of the present invention may further comprise a method of modifying a non-coating grade asphalt to produce a coating grade asphalt without oxidation of the non-coating grade asphalt comprising: heating the non-coating grade asphalt to a melting temperature in a mixing chamber to produce a melted non-coating grade asphalt, the non-coating grade asphalt comprising: a blend of AC-20 asphalt and approximately 20% 0-Pen asphalt; mixing the melted non-coating grade asphalt with additives to create a mixture which improves properties of the non-coating grade asphalt to properties of a coating grade asphalt, without oxidizing the non-coating grade asphalt, the additives comprising: a synthetic wax produced by de-polymerization of low density polyethylene that has a concentration of approximately 10% to 15% of the mixture; a thermoplastic polyolefin having a concentration of approximately 3% of the mixture.

An embodiment of the present invention may further comprise a method of modifying a non-coating grade asphalt to produce a coating grade asphalt without oxidation of the non-coating grade asphalt comprising: heating the non-coating grade asphalt to a melting temperature in a mixing chamber to produce a melted non-coating grade asphalt, the non-coating grade asphalt comprising: a blend of AC-20 asphalt and approximately 20% 0-Pen asphalt; mixing the melted non-coating grade asphalt with additives to create a mixture which improves properties of the non-coating grade asphalt to properties of a coating grade asphalt, without oxidizing the non-coating grade asphalt, the additive comprising: a synthetic wax, produced by de-polymerization of high density polyethylene, that has a concentration of approximately 10% to 15% of the mixture; a thermoplastic polyolefin having a concentration of approximately 3% of the mixture.

An embodiment of the present invention may further comprise a method of modifying a non-coating grade asphalt to produce a coating grade asphalt without oxidation of the non-coating grade asphalt comprising: heating the non-coating grade asphalt to a melting temperature in a mixing chamber to produce a melted non-coating grade asphalt, the non-coating grade asphalt comprising: a blend of AC-20 asphalt and approximately 25% 0-Pen asphalt; mixing the melted non-coating grade asphalt with additives to create a mixture that improves properties of the non-coating grade asphalt to properties of a coating grade asphalt, without oxidizing the non-coating grade asphalt, the additives comprising: a synthetic wax produced by de-polymerization of high density polyethylene that has a concentration of approximately 10% of the mixture; naphtha resid having a concentration of approximately 10% of the mixture.

An embodiment of the present invention may further comprise a coating grade asphalt suitable for making asphalt roofing shingles comprising: a non-coating grade asphalt, that has not been oxidized, comprising: a blend of 35/50 Pen-graded asphalt and 5% to 15% of 0-Pen asphalt; at least one additive mixed with the non-coating grade asphalt to modify the non-coating grade asphalt, without oxidizing the non-coating grade asphalt, to create a mixture that has properties of a coating grade asphalt, the at least one additive comprising: a fine crystalline, long chain, aliphatic polymethylene hydrocarbon wax, made using a Fischer-Tropsch process, the fine crystalline, long chain, aliphatic polymethylene hydrocarbon wax having a concentration of approximately 3% of the mixture.

An embodiment of the present invention may further comprise a coating grade asphalt suitable for making asphalt roofing shingles comprising: a non-coating grade asphalt, that has not been oxidized, comprising: a blend of AC-20 asphalt and 0% to 20% of 0-Pen asphalt; at least one additive mixed with the non-coating grade asphalt to modify the non-coating grade asphalt, without oxidizing the non-coating grade asphalt, to create a mixture that has properties of a coating grade asphalt, the at least one additive comprising: a fine crystalline, long chain, aliphatic polymethylene hydrocarbon wax, that is made using a Fischer-Tropsch process, the fine crystalline, long chain, aliphatic polymethylene hydrocarbon wax having a concentration of approximately 0% to 20% of the mixture; a thermoplastic polyolefin having a concentration of approximately 3% of the mixture which increases flexibility at low temperatures.

An embodiment of the present invention may further comprise a coating grade asphalt suitable for making asphalt roofing shingles comprising: a non-coating grade asphalt, that has not been oxidized, comprising: a blend of AC-20 asphalt and 5% to 20% of 0-Pen asphalt; at least one additive mixed with the non-coating grade asphalt to modify the non-coating grade asphalt, without oxidizing the non-coating grade asphalt, to create a mixture that has properties of a coating grade asphalt, the at least one additive comprising: a polyethylene synthetic wax having a concentration of 0% to 20% of the mixture; a thermoplastic polyolefin having a concentration of approximately 3% of the mixture.

An embodiment of the present invention may further comprise a coating grade asphalt suitable for making asphalt roofing shingles comprising: a non-coating grade asphalt, that has not been oxidized, comprising: a blend of AC-20 asphalt and 0% to 20% of 0-Pen asphalt; at least one additive mixed with the non-coating grade asphalt to modify the non-coating grade asphalt, without oxidizing the non-coating grade asphalt, to create a mixture that has properties of a coating grade asphalt, the at least one additive comprising: a polyethylene synthetic wax having a concentration of 0% to 20% of the mixture; a thermoplastic polyolefin having a concentration of approximately 3% of the mixture.

An embodiment of the present invention may further comprise a coating grade asphalt suitable for making asphalt roofing shingles comprising: a non-coating grade asphalt, that has not been oxidized, comprising: a blend of AC-20 asphalt and 0% to 30% of 0-Pen asphalt; at least one additive mixed with the non-coating grade asphalt to modify the non-coating grade asphalt, without oxidizing the non-coating grade asphalt, to create a mixture that has properties of a coating grade asphalt, the at least one additive comprising: a synthetic wax, produced by de-polymerization of polyethylene or polypropylene, having a concentration of approximately 10% of the mixture; a thermoplastic polyolefin having a concentration of approximately 3% of the mixture.

An embodiment of the present invention may further comprise a coating grade asphalt suitable for making asphalt roofing shingles comprising: a non-coating grade asphalt, that has not been oxidized, comprising: a blend of AC-20 asphalt and approximately 20% of 0-Pen asphalt; at least one additive mixed with the non-coating grade asphalt to modify the non-coating grade asphalt, without oxidizing the non-coating grade asphalt, to create a mixture that has properties of a coating grade asphalt, the at least one additive comprising: a synthetic wax, produced by de-polymerization of low density polyethylene that has a concentration of approximately 10% to 15% of the mixture; a thermoplastic polyolefin having a concentration of approximately 3% of the mixture.

An embodiment of the present invention may further comprise a coating grade asphalt suitable for making asphalt roofing shingles comprising: a non-coating grade asphalt, that has not been oxidized, comprising: a blend of AC-20 asphalt and approximately 20% of 0-Pen asphalt; at least one additive mixed with the non-coating grade asphalt to modify the non-coating grade asphalt, without oxidizing the non-coating grade asphalt, to create a mixture that has properties of a coating grade asphalt, the at least one additive comprising: a synthetic wax, produced by de-polymerization of high density polyethylene, that has a concentration of approximately 10% to 15% of the mixture; a thermoplastic polyolefin having a concentration of approximately 3% of the mixture.

An embodiment of the present invention may further comprise a coating grade asphalt suitable for making asphalt roofing shingles comprising: a non-coating grade asphalt, that has not been oxidized, comprising: a blend of AC-20 asphalt and approximately 25% of 0-Pen asphalt; at least one additive mixed with the non-coating grade asphalt to modify the non-coating grade asphalt, without oxidizing the non-coating grade asphalt, to create a mixture that has properties of a coating grade asphalt, the at least one additive comprising: a synthetic wax, produced by de-polymerization of high density polyethylene that has a concentration of approximately 10% of the mixture; naphtha resid having a concentration of approximately 10% of the mixture.

BRIEF DESCRIPTION OF THE DRAWINGS

FIGS. 2A-6 illustrate test results of the use of various additives to non-coating grade asphalt.

DETAILED DESCRIPTION OF THE EMBODIMENTS

Figure 1:
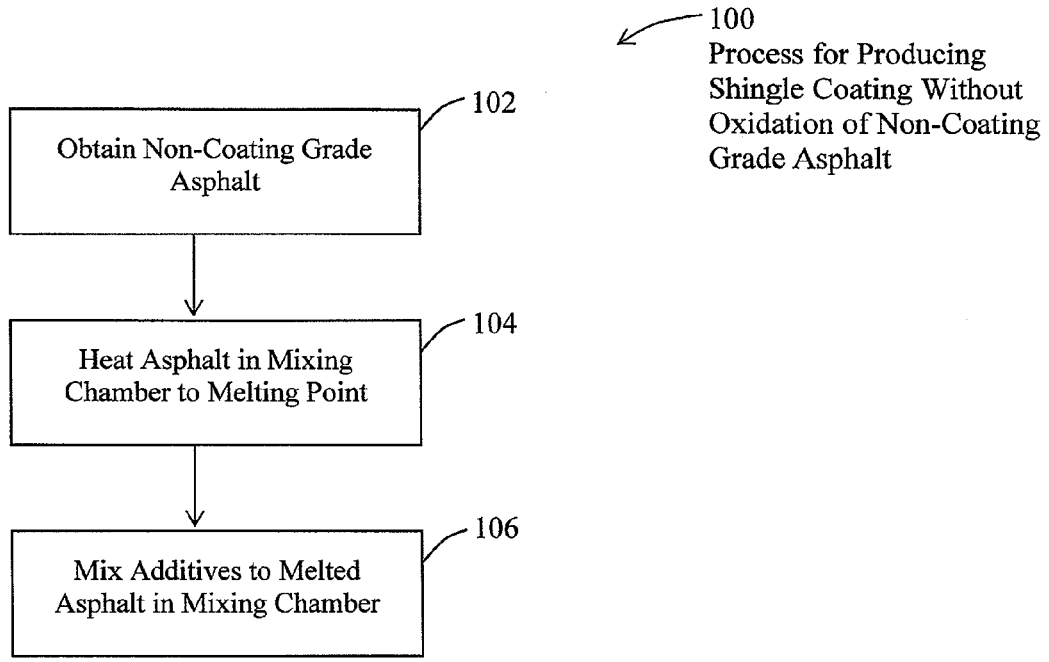
FIG. 1 is a flow diagram of the process for producing shingle coating without oxidation of non-coating grade asphalt.

FIG. 1 is a process 100 for producing coating grade asphalt from non-coating grade asphalt without oxidation of the non-coating grade asphalt. Coating grade asphalt is normally considered to be a special grade of asphalt that meets the requirements of penetration, viscosity, soft point, brittleness and other criteria for asphalt shingles after the coating grade asphalt is oxidized. Oxidation of coating asphalts raises the softening point, so that the dimensions of the shingle are maintained at high temperatures, up to 160° F. or more, to lower hardness (penetration), to lower the melt viscosity, which allows the fabrication of roofing shingles at high speeds after addition of a filler and creation of a durable shingle that can be subjected to intense solar radiation, high temperatures and rain. Other considerations of the coating asphalt that is used for making shingles include flexibility, staining, brittleness at low temperatures, and weathering, which may also be improved by oxidation.

Penetration is a measure of hardness of the asphalt material and normally should be in the range of 16-23 dmm for asphalt shingles (15 dmm is minimum per ASTM D3462). The softening point (SP) is a temperature at which bitumen becomes soft enough to flow. The softening point should be in the range of 190° F. to 235° F. per ASTM D3462.

The process of oxidation is known in the industry as a blow process. This process comprises blowing an oxygen-containing gas, such as air, through the asphalt at an elevated temperature. The purpose of the process is to increase the hardness of the paving grade asphalt. The asphalt is placed in a converter (oxidizer) and melted at a temperature of approximately 200° C. to 230° C. The oxygen-containing gases are blown through the molten asphalt. An exothermic reaction occurs when the asphalt is oxidized, which raises the temperature, in some cases from about 250° C. to 265° C. This process can be run as a batch process or a continuous process. Catalysts may also be used in the oxidation process, including ferric chloride and polyphosphoric acid. The process of oxidation is disclosed in detail in U.S. Pat. No. 7,951,239, issued to Trumbore et al. on May 31, 2011, which is specifically incorporated herein by reference for all that it discloses and teaches. As also disclosed in the Trumbore et al. patent, various types of waxes can be added to beneficially alter the properties of an asphalt after partial oxidation.

As shown in FIG. 1, an embodiment of the present invention is used to beneficially alter the properties of a non-coating grade asphalt without oxidation. As disclosed in FIG. 1, a non-coating grade asphalt 102 is obtained. In that regard, a mixture of various types of non-coating grade asphalts can be used, including AC 20-50, PG 64-22, PG 67-22, PG 70-22, PG 58-22, PG 70-16, PG 70-10, PG 67-10, Pengrade 40-50, Pengrade 60-70, Pengrade 85-100, Pengrade 120-150, AR4000, AR8000, 0-Pen, and similar asphalts.

Non-coating grade asphalts with the PG nomenclature are also referred to as paving grade asphalts. Paving grade asphalts are a commodity that are projected to remain in good supply and less costly than coating grade asphalts in the future. Paving grade asphalts are harder asphalts that have lower penetration numbers. In addition, the paving grade asphalts have a higher softening point and higher viscosity. Paving grade asphalts can be catalytically oxidized to produce coating grade asphalt to create shingles. Paving grade asphalts that may be utilized in accordance with the various embodiments of this invention are listed above.

The use of additives to beneficially modify the properties of non-coating asphalts, such as paving grade asphalts, has been recognized to some extent, such as disclosed in the above referenced U.S. Pat. No. 7,951,239 issued to Trumbore et al. However, the use of additives has also included a process step of oxidizing, or at least partially oxidizing, the asphalt to assist in modifying the properties of the asphalt. Embodiments of this invention outline the selection of certain additives in certain ratios with specific types of paving grade asphalts and hard asphalts that can produce coating grade asphalt without oxidation of the asphalt. One of the problems with the process of oxidizing is that the vapors created by the oxidation process create an environmental and health hazard. Expensive capturing and scrubbing devices must be utilized to meet air quality standards. As such, the elimination of the oxidation process and the use of additives in a mixing chamber, without oxidation, reduces health hazards and environmental problems while eliminating the cost of expensive oxidizing apparatus.

Wax additives are the primary additives that are introduced to the mixing chamber to modify the properties of the paving grade asphalts so that these non-coating grade asphalts can be used as coating grade asphalts for the production of roof shingles. Wax additives generally fall into two different categories, i.e., crystalline and non-crystalline waxes. Crystalline waxes occur naturally in petroleum. Crystalline waxes are generally detrimental to the low temperature properties of asphalts and require the addition of low-temperature flexibilizers. Non-crystalline waxes are fabricated from various types of feed stock including polyethylene materials. Non-crystalline waxes are generally not detrimental to the low temperature properties of asphalts. Non-crystalline waxes reduce viscosity of the asphalt at processing temperatures and do not affect the service temperature properties, i.e., the properties of the asphalt when utilized as a shingle.

One of the categories of waxes that may be used as an additive are the fine crystalline, long chain, aliphatic polymethylene hydrocarbon (Sasol) waxes that are created by the Fischer-Tropsch process. These are commonly referred to as FT (Fischer-Tropsch) hard waxes. One of the commercially available FT hard waxes is sold under the trademark SASOBIT. This product is available from Sasol Wax North America Corporation, 21325-B Cabot Blvd., Hayward, Calif., 94545. This Sasol wax is a fine crystalline, long-chain aliphatic polymethylene hydrocarbon produced from coal gasification using the Fischer-Tropsch (FT) process. In the Fischer-Tropsch synthesis, coal or natural gas (methane) is partially oxidized to obtain carbon monoxide (CO). The carbon monoxide is then reacted with hydrogen using a catalyst to produce a mixture of hydrocarbons having molecular chain links of carbon from $C_5$ to $C_{100}$ or greater. Iron or cobalt can be used as a catalyst to generate products such as synthetic naphtha, kerosene, gasoil and waxes. The liquid products are separated, and the FT waxes are recovered. The FT waxes can be hydrocracked to form transportation fuels or chemical feed stocks. The Sasol wax that is recovered has carbon chain links of $C_{45}$ to $C_{100}$ or greater. The longer chain carbons in the FT wax create a higher melting point of the mixture. The smaller crystalline structure of the FT wax reduces brittleness at low temperatures. This is disclosed in more detail in NCAT Report 05-06 "Evaluation of SASOBIT for use in Warm Mix Asphalt" by Graham C. Harley and Brian D. Prowell, National Center for Asphalt Technology (NEAT), Auburn University, June 2005.

Ceranovus waxes are waxes that are produced from polyethylene and polypropylene. High quality synthetic waxes are produced by a de-polymerization process. These waxes are available from Ceranovus Chemicals, Inc., 101 College Street, Toronto, Canada M5GIL7. These synthetic waxes can be high density, low density, and linear low density waxes.

Another type of polyethylene wax is a polyethylene synthetic wax which is sold under the trademark VESTOWAX. This type of polyethylene wax can be produced using two different processes, the Ziegler polymerization process and the Fischer-Tropsch process. Ziegler polymerization of ethylene synthesizes polyethylene waxes with different densities and molecular weights depending upon the preparation conditions. The Fischer-Tropsch process can be used to generate straight chain products that have a low viscosity when melted and molecular weights between 500 G/mol and 1,000 G/mol. The formulation is a hard paraffin.

Thermoplastic polyolefins such as ADFLEX can be used to reduce brittleness of the asphalt shingle at low temperatures. ADFLEX has a very high softness and a very low modulus. This thermoplastic polymer has excellent low temperature impact resistance, excellent chemical and environmental stress-cracking resistance and is a no slip, no anti-block thermoplastic olefin resin. ADFLEX is available from Lyondellbasell Polymers, Morris, Ill. ADFLEX improves cold bending temperature even after thermal or UV aging. Cold bending temperatures can be as low as −20° C., even after aging of the shingle. ADFLEX decreases penetration values which avoids footprints during membrane installation.

Each of these additives can be mixed with various types of non-coating grade asphalts in specific proportions to achieve the desired physical characteristics of a coating asphalt suitable for fabricating shingles and meeting industry standards. For example, the mixtures of additives disclosed below, and in FIGS. 2-6, for the specified asphalt types, and asphalt mixtures, meet the hardness, softening point temperature, viscosity and low temperature flexibility that are required for a coating asphalt.

The non-coating grade asphalt is placed in a mixing chamber at step 104 and heated until the asphalt melts to a liquid. Various additives are then mixed into the melted asphalt in the mixing chamber at step 106. The non-coating grade asphalt is modified to have properties that are suitable for use as a coating asphalt for making shingles.

FIG. 2A is a table that shows the effects of a Sasobit wax and a Vestowax added to a refined 35/50 Pen-graded asphalt (141° F. SP/33Pen). The specific asphalt utilized was from NuStar. The heated asphalt was mixed with the Sasobit wax, in one instance, and the Vestowax, in another instance. FIG. 2A shows the results of the addition of these waxes. For example, the Sasobit wax, which is an FT hard wax, shows mixtures of 5%, 7.5% and 10% wax, which produced soft point temperatures and penetration results that fall within the ranges for the standards set forth by ASTM 3462. The Vestowax, which is a synthesized polyethylene wax, was also mixed with the 35/50 Pen-graded asphalt at 5% and 6% of the mixture to create soft points and penetrations that fall within the ASTM 3462 standards.

As shown in FIG. 2B, this same asphalt, i.e., the refined 35/50 Pen-graded asphalt (141° F. SP/33 Pen), was performance tested prior to mixing with a limestone filling and after filling with 69% limestone. Adflex stabilizer, which is a thermoplastic polyolefin, was also mixed to increase flexibility. The PAV flexibility was also tested to model long term stability by determining low temperature brittleness of the wax modified asphalt coating. Accelerated weathering tests were also performed in a 2000 hour WOM. Both the 6% Vestowax and the 6% plus 3% Adflex samples passed.

As further shown in FIG. 2B, the unfilled soft point of the 35/50 Pen-graded asphalt was 220° F., with a 6% Vestowax, and 217° F. with a 6% Vestowax and 3% Adflex mixture. The same 35/50 Pen-graded asphalt had a soft point after oxidation of 207° F. All of these soft points are within an acceptable range for a coating grade asphalt. The refined 35/50 Pen-graded asphalt, prior to mixing with the limestone filling, also fell within the acceptable penetration ranges of 20 dmm for 6% Vestowax and 18 dmm for 6% Vestowax plus 3% Adflex. Similarly, the unfilled flashpoint was within acceptable ranges.

The remaining results in FIG. 2B show the results of the asphalt that was mixed with 69% limestone. The filled soft point fell within the acceptable ranges. The viscosity at 400° for the filled asphalt was reduced by a great amount using the 6% Vestowax, and was also significantly reduced with 6% Vestowax and 3% Adflex. Low viscosity is advantageous in increasing production rates in the production line for making asphalt shingles. The initial flexibility of the filled asphalt was less than the oxidized asphalt, but still well within the flexibility ranges. The aged flexibility was within an acceptable range for the 6% Vestowax and 3% Adflex. The stain index for the filled coating was zero for both the 6% Vestowax and the 6% Vestowax with 3% Adflex. The accelerated weathering test at the 2000 hour WOM also passed with the addition of the waxes.

FIG. 3 illustrates the effects of the addition of various waxes to paving grade (PG) asphalts from two different sources. In this case, source A is NuStar, located at 19003 IH-10 West, San Antonio, Tex. 78257, which has subsequently sold its asphalt business to Axeon Specialty Products, P.O. Box 781269, San Antonio, Tex. 78278, and source B is Trumbull Industries, located at 1040 N. Meridian Road, Youngstown, Ohio, 44501. The NuStar PG 64-22 paving grade asphalt was mixed with 10% Sasobit. The modified soft point was increased from 120° F. to 213° F. Additionally, the penetration was reduced from 67 dmm to 21 dmm. Both the modified soft point and the modified Pen fall within acceptable ranges for a coating asphalt. The Trumbull PG 67-22 was mixed with 7.5% Sasobit and 10% Sasobit. Again, the penetrations fell to acceptable ranges, as well as the modified soft point. The same asphalt, PG 67-22, was mixed with 10% Vestowax and 15% Vestowax. Again, the modified soft point and modified Pen fell within acceptable ranges for a coating type of asphalt. The same asphalt was mixed with a Ceranovus wax at both 10% and 15% concentrations. The modified soft points and modified Pen also fell within acceptable ranges. It should be noted that all of these paving asphalts illustrated in FIG. 3 were hard asphalts that were modified to have greatly reduced hardness from the initial hardness of these asphalts.

FIG. 4 illustrates a blended mixture of 5%, 10% and 15% of 0-Pen asphalt with a refined 35/50 Pen-graded asphalt (141° F. SP/33 Pen) and the effect of Sasobit on these blended asphalts. With 3% of the Sasobit (Fischer-Tropsch) wax added, each of the blended mixtures of asphalts produced soft points and penetration values that fell within an acceptable range for a coating type of asphalt.

FIG. 5 illustrates the effect of certain waxes on a blended mixture of refined AC-20 asphalt (124° F. SP/53 Pen) and various percentages of 0-Pen asphalt. Sasobit, Vestowax and Ceranovus waxes were added in certain percentages, and certain percentages of the 0-Pen percent asphalt were blended with the AC-20 asphalt. The results show a soft point and penetration number that all fall within an acceptable range.

FIG. 6 illustrates a refined AC-20 asphalt (124° F. SP/53 Pen) that is blended with a 25% 0-Pen and 10% Ceranovus AW-115A wax, along with the presence or absence of 10% naphtha resid, which functions as a softening agent and a flexibilizer. Without the naphtha resid added, the mixture fails. With the addition of the naphtha resid at approximately 10%, both the penetration and aged flexibility pass these tests.

Accordingly, acceptable coating-grade asphalts can be produced by the addition of various non-crystalline waxes and low temperature flexbilizers. As such, the process of oxidation of the asphalts, which causes environmental and health problems, can be avoided.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of modifying a non-coating grade asphalt to produce a coating grade asphalt without oxidation of said non-coating grade asphalt comprising:
    heating said non-coating grade asphalt to a melting temperature in a mixing chamber to produce a melted non-coating grade asphalt, said non-coating grade asphalt comprising:
        a blend of AC-20 asphalt and 10% to 20% of 0-Pen asphalt;
    mixing said melted non-coating grade asphalt with additive to create a mixture which improves properties of said non-coating grade asphalt to properties of a coating grade asphalt, without oxidizing said non-coating grade asphalt, said additives comprising:
        a fine crystalline, long chain, aliphatic polymethylene hydrocarbon wax having a concentration of approximately 10% to 20% of said mixture;
        a thermoplastic polyolefin having a concentration of approximately 3% of said mixture to increase flexibility at low temperatures.

2. A method of modifying a non-coating grade asphalt to produce a coating grade asphalt without oxidation of said non-coating grade asphalt comprising:
    heating said non-coating grade asphalt to a melting temperature in a mixing chamber to produce a melted non-coating grade asphalt, said non-coating grade asphalt comprising:
        a blend of AC-20 asphalt and 10% to 20% of 0-Pen asphalt;
    mixing said melted non-coating grade asphalt with additives to create a mixture which improves properties of said non-coating grade asphalt to properties of a coating grade asphalt, without oxidizing said non-coating grade asphalt, said additives comprising:
        a polyethylene synthetic wax having a concentration of 10% to 15% of said mixture;
        a thermoplastic polyolefin having a concentration of approximately 3% of said mixture.

3. A method of modifying a non-coating grade asphalt to produce a coating grade asphalt without oxidation of said non-coating grade asphalt comprising:
    heating said non-coating grade asphalt to a melting temperature in a mixing chamber to produce a melted non-coating grade asphalt, said non-coating grade asphalt comprising:
        a blend of AC-20 asphalt and 10% to 30% 0-Pen asphalt;
    mixing said melted non-coating grade asphalt with additives to create a mixture which improves properties of said non-coating grade asphalt to properties of a coating grade asphalt, without oxidizing said non-coating grade asphalt, said additives comprising:
        a synthetic wax produced by de-polymerization of polyethylene or polypropylene having a concentration of approximately 10% of said mixture;
        a thermoplastic polyolefin having a concentration of approximately 3% of said mixture.

4. A method of modifying a non-coating grade asphalt to produce a coating grade asphalt without oxidation of said non-coating grade asphalt comprising:
    heating said non-coating grade asphalt to a melting temperature in a mixing chamber to produce a melted non-coating grade asphalt, said non-coating grade asphalt comprising:
        a blend of AC-20 asphalt and approximately 20% 0-Pen asphalt;
    mixing said melted non-coating grade asphalt with additives to create a mixture which improves properties of said non-coating grade asphalt to properties of a coating grade asphalt, without oxidizing said non-coating grade asphalt, said additives comprising:
        a synthetic wax produced by de-polymerization of low density polyethylene that has a concentration of approximately 10% to 15% of said mixture;
        a thermoplastic polyolefin having a concentration of approximately 3% of said mixture.

5. A method of modifying a non-coating grade asphalt to produce a coating grade asphalt without oxidation of said non-coating grade asphalt comprising:
    heating said non-coating grade asphalt to a melting temperature in a mixing chamber to produce a melted non-coating grade asphalt, said non-coating grade asphalt comprising:
        a blend of AC-20 asphalt and approximately 20% 0-Pen asphalt;
    mixing said melted non-coating grade asphalt with additives to create a mixture which improves properties of said non-coating grade asphalt to properties of a coating grade asphalt, without oxidizing said non-coating grade asphalt, said additive comprising:
        a synthetic wax, produced by de-polymerization of high density polyethylene that has a concentration of approximately 10% to 15% of said mixture;
        a thermoplastic polyolefin having a concentration of approximately 3% of said mixture.

6. A method of modifying a non-coating grade asphalt to produce a coating grade asphalt without oxidation of said non-coating grade asphalt comprising:
    heating said non-coating grade asphalt to a melting temperature in a mixing chamber to produce a melted non-coating grade asphalt, said non-coating grade asphalt comprising:
        a blend of AC-20 asphalt and approximately 25% 0-Pen asphalt;
    mixing said melted non-coating grade asphalt with additives to create a mixture that improves properties of said non-coating grade asphalt to properties of a coating grade asphalt, without oxidizing said non-coating grade asphalt, said additives comprising:
        a synthetic wax produced by de-polymerization of high density polyethylene that has a concentration of approximately 10% of said mixture;
        naphthenic resid having a concentration of approximately 10% of said mixture.

7. A coating grade asphalt suitable for making asphalt roofing shingles comprising:

a non-coating grade asphalt, that has not been oxidized, comprising:
  a blend of AC-20 asphalt and 10% to 20% of 0-Pen asphalt;
at least one additive mixed with said non-coating grade asphalt to modify said non-coating grade asphalt, without oxidizing said non-coating grade asphalt, to create a mixture that has properties of a coating grade asphalt, said at least one additive comprising:
  a fine crystalline, long chain, aliphatic polymethylene hydrocarbon wax, that is made using a Fischer-Tropsch process, said fine crystalline, long chain, aliphatic polymethylene hydrocarbon wax having a concentration of approximately 10% to 20% of said mixture;
  a thermoplastic polyolefin having a concentration of approximately 3% of said mixture which increases flexibility at low temperatures.

8. A coating grade asphalt suitable for making asphalt roofing shingles comprising:
a non-coating grade asphalt, that has not been oxidized, comprising:
  a blend of AC-20 asphalt and 5% to 20% of 0-Pen asphalt;
at least one additive mixed with said non-coating grade asphalt to modify said non-coating grade asphalt, without oxidizing said non-coating grade asphalt, to create a mixture that has properties of a coating grade asphalt, said at least one additive comprising:
  a polyethylene synthetic wax having a concentration of 10% to 15% of said mixture;
  a thermoplastic polyolefin having a concentration of approximately 3% of said mixture.

9. A coating grade asphalt suitable for making asphalt roofing shingles comprising:
a non-coating grade asphalt, that has not been oxidized, comprising:
  a blend of AC-20 asphalt and 10% to 20% of 0-Pen asphalt;
at least one additive mixed with said non-coating grade asphalt to modify said non-coating grade asphalt, without oxidizing said non-coating grade asphalt, to create a mixture that has properties of a coating grade asphalt, said at least one additive comprising:
  a polyethylene synthetic wax having a concentration of 10% to 15% of said mixture;
  a thermoplastic polyolefin having a concentration of approximately 3% of said mixture.

10. A coating grade asphalt suitable for making asphalt roofing shingles comprising:
a non-coating grade asphalt, that has not been oxidized, comprising:
  a blend of AC-20 asphalt and 10% to 30% of 0-Pen asphalt;
at least one additive mixed with said non-coating grade asphalt to modify said non-coating grade asphalt, without oxidizing said non-coating grade asphalt, to create a mixture that has properties of a coating grade asphalt, said at least one additive comprising:
  a synthetic wax, produced by de-polymerization of polyethylene or polypropylene, having a concentration of approximately 10% of said mixture;
  a thermoplastic polyolefin having a concentration of approximately 3% of said mixture.

11. A coating grade asphalt suitable for making asphalt roofing shingles comprising:
a non-coating grade asphalt, that has not been oxidized, comprising:
  a blend of AC-20 asphalt and approximately 20% of 0-Pen asphalt;
at least one additive mixed with said non-coating grade asphalt to modify said non-coating grade asphalt, without oxidizing said non-coating grade asphalt, to create a mixture that has properties of a coating grade asphalt, said at least one additive comprising:
  a synthetic wax, produced by de-polymerization of low density polyethylene that has a concentration of approximately 10% to 15% of said mixture;
  a thermoplastic polyolefin having a concentration of approximately 3% of said mixture.

12. A coating grade asphalt suitable for making asphalt roofing shingles comprising:
a non-coating grade asphalt, that has not been oxidized, comprising:
  a blend of AC-20 asphalt and approximately 20% of 0-Pen asphalt;
at least one additive mixed with said non-coating grade asphalt to modify said non-coating grade asphalt, without oxidizing said non-coating grade asphalt, to create a mixture that has properties of a coating grade asphalt, said at least one additive comprising:
  a synthetic wax, produced by de-polymerization of high density polyethylene, that has a concentration of approximately 10% to 15% of said mixture;
  a thermoplastic polyolefin having a concentration of approximately 3% of said mixture.

13. A coating grade asphalt suitable for making asphalt roofing shingles comprising:
a non-coating grade asphalt, that has not been oxidized, comprising:
  a blend of AC-20 asphalt and approximately 25% of 0-Pen asphalt;
at least one additive mixed with said non-coating grade asphalt to modify said non-coating, grade asphalt, without oxidizing said non-coating grade asphalt, to create a mixture that has properties of a coating grade asphalt, said at least one additive comprising:
  a synthetic wax, produced by de-polymerization of high density polyethylene that has a concentration of approximately 10% of said mixture;
  naphthenic resid having a concentration of approximately 10% of said mixture.

* * * * *